(12) United States Patent
Santini

(10) Patent No.: US 12,370,748 B2
(45) Date of Patent: Jul. 29, 2025

(54) HIGH-FREQUENCY WELDING METHOD

(71) Applicant: COLOR-DEC ITALY S.R.L., Camaiore (IT)

(72) Inventor: Daniele Santini, Camaiore (IT)

(73) Assignee: COLOR-DEC ITALY S.R.L., Camaiore (IT)

( * ) Notice: Subject to any disclaimer, the term of this patent is extended or adjusted under 35 U.S.C. 154(b) by 242 days.

(21) Appl. No.: 17/795,803

(22) PCT Filed: Feb. 1, 2021

(86) PCT No.: PCT/IB2021/050774
§ 371 (c)(1),
(2) Date: Jul. 27, 2022

(87) PCT Pub. No.: WO2021/152558
PCT Pub. Date: Aug. 5, 2021

(65) Prior Publication Data
US 2023/0060938 A1  Mar. 2, 2023

(30) Foreign Application Priority Data
Jan. 31, 2020  (IT) .................. 102020000001978

(51) Int. Cl.
*B29C 65/00* (2006.01)
*B29C 65/04* (2006.01)
(Continued)

(52) U.S. Cl.
CPC .............. *B29C 65/04* (2013.01); *B29C 65/08* (2013.01); *B29C 65/4815* (2013.01); *B29C 65/7437* (2013.01); *B29C 65/7441* (2013.01); *B29C 65/7847* (2013.01); *B29C 66/0062* (2013.01); *B29C 66/02242* (2013.01);
(Continued)

(58) Field of Classification Search
CPC .......... B29C 65/04; B29C 65/08; B29C 65/45
See application file for complete search history.

(56) References Cited

U.S. PATENT DOCUMENTS 3,859,150 A    1/1975   Van Amburg
4,313,776 A *  2/1982   Urai .................... B29C 66/8322
                                              156/289

(Continued)

*Primary Examiner* — Philip C Tucker
*Assistant Examiner* — Nickolas R Harm
(74) *Attorney, Agent, or Firm* — Volpe Koenig

(57) ABSTRACT

High-frequency welding method for welding an accessory to a substrate by high-frequency welding machinery which includes a female mold, having a cavity formed by a profile having substantially the same shape and dimensions as the accessory, and a male mold, having a relief formed by a profile having substantially the same shape and dimensions as the accessory. The method includes: mounting the female mold on a movable upper plate of the machinery and the male mold on a fixed lower plate of the machinery, or vice versa, such that the profile of the cavity is aligned in a closure direction of the molds with the profile of the relief. The method further includes: positioning the accessory on the relief or in the cavity; positioning the substrate above the accessory; moving the upper plate towards the lower plate; supplying high-frequency welding energy to the upper plate and/or to the lower plate.

15 Claims, 5 Drawing Sheets

(51) Int. Cl.
*B29C 65/08* (2006.01)
*B29C 65/48* (2006.01)
*B29C 65/74* (2006.01)
*B29C 65/78* (2006.01)

(52) U.S. Cl.
CPC .... *B29C 66/1122* (2013.01); *B29C 66/30621* (2013.01); *B29C 66/45* (2013.01); *B29C 66/4724* (2013.01); *B29C 66/71* (2013.01); *B29C 66/723* (2013.01); *B29C 66/7292* (2013.01); *B29C 66/7392* (2013.01); *B29C 66/7484* (2013.01); *B29C 66/7485* (2013.01); *B29C 66/8122* (2013.01); *B29C 66/81427* (2013.01); *B29C 66/81431* (2013.01); *B29C 66/81871* (2013.01); *B29C 66/8322* (2013.01); *B29C 66/8432* (2013.01)

(56) References Cited

U.S. PATENT DOCUMENTS

| | | | |
|---|---|---|---|
| 9,090,017 B1 * | 7/2015 | Lin | B29C 66/8322 |
| 2011/0078922 A1 * | 4/2011 | Cavaliere | B29D 35/126 |
| | | | 36/77 R |

\* cited by examiner

HIGH-FREQUENCY WELDING METHOD

FIELD OF THE INVENTION

The invention relates to a high-frequency welding method. The invention further relates to a high-frequency welding method for applying an accessory, which defines a profile having a specific shape and dimensions, to a substrate, for example, a woven material for the footwear sector, leather goods, clothing, etc.

BACKGROUND

High-frequency welding, also called dielectric welding, ultrasonic welding, radiofrequency welding, etc., is a process which allows welding to be obtained between two or more elements by means of mechanical vibrations, generally between 15 kHz and 50 KHz. The generated friction of the vibrations at high electrical frequencies causes the molecules inside the elements to move, generating heat.

An example of high frequency welding is described in U.S. Pat. No. 3,859,150 which refers to a method for fixing zippers on boots. The method involves the use of a pair of molds, between which the material that forms the upper of the boot is positioned. The upper mold has two pairs of reliefs which, when the mold is closed, rest on a flat surface of the lower mold.

However, this method is not generally suitable for fixing accessories on a fabric of a garment or on other types of similar substrates.

It will be appreciated that in the context of the present invention the term "accessory" is intended to be understood to be a decorative patch, a label, a piece of writing, a logo, a pattern, a design, etc., which can be applied to a substrate, for example, a woven material.

The accessory is generally produced from a polymer material. The most commonly used materials for high-frequency welding operations are PVC (polyvinyl chloride), sometimes called vinyl, and PU (polyurethane).

The tool used to carry out this type of welding is a generator which produces high-frequency welding energy and which supplies it to one or both of the electrodes. The electrode is connected to a press, which allows the electrode to move into contact and to apply a given pressure to the elements to be welded. The electrode generally has a pattern in relief or in a recessed manner, for example, a logo, which will be impressed in the material to be welded. The electrode is generally provided with a cutting edge which will cut the excess material, outside the pattern impressed into the material.

During welding, the application of high-frequency welding energy is carried out along the external perimeter of the accessory which will be welded to the substrate. The high-frequency welding energy is not therefore applied to the whole surface of the accessory to be welded and this involves a limited resistance of the welding. The Applicant has established, for example, that the articles of clothing provided with an accessory which is welded with a standard high-frequency welding method, after a number of washes, often have a deterioration of the accessory and a partial or total detachment of the accessory from the substrate.

It will also be appreciated that the solution described in U.S. Pat. No. 3,859,150 cannot be considered suitable for a fastening capable of providing sufficient adhesion to the accessory since, precisely because it is intended for fastening hinges, it is necessary that the latter is partially mobile with respect to the substrate to which it is attached.

Therefore, the problem addressed by the present invention is to provide a high-frequency welding method which is configured to at least partially overcome one or more of the disadvantages set out with reference to the cited prior art.

This problem is solved by the invention by means of a high-frequency welding method for welding an accessory, which defines a profile having a specific shape and dimensions, to a substrate, this method being carried out according to one or more of the appended claims.

SUMMARY

Preferably, the method to which the invention relates is carried out by means of high-frequency welding machinery which includes a female mold, which comprises a cavity which is formed by a profile having substantially the same shape and dimensions as the accessory, and a male mold, which comprises a relief which is formed by a profile having substantially the same shape and dimensions as the accessory. According to an aspect of the invention, the method comprises: mounting the female mold or the male mold on a movable upper plate of the high-frequency welding machinery; mounting on a fixed lower plate of the high-frequency welding machinery the female mold if the male mold is mounted on the upper plate or the male mold if the female mold is mounted on the upper plate in such a manner that the profile of the cavity is aligned in a closure direction of the molds with the profile of the relief in such a manner that, when the female mold is closed on the male mold, the profile of the cavity coincides with the profile of the relief; positioning the accessory on the relief if the male mold is mounted on the fixed lower plate in such a manner that the profile of the accessory coincides with the profile of the relief or in the cavity if the female mold is mounted on the fixed lower plate in such a manner that the profile of the accessory coincides with the profile of the cavity; positioning the substrate above the accessory; moving the movable upper plate towards the fixed lower plate in such a manner that the accessory is pressed between the cavity and the relief; supplying high-frequency welding energy to the movable upper plate and/or to the fixed lower plate so as to weld the accessory to the substrate.

The term "profile" is intended to be understood to be the profile line of the accessory, that is to say, the external contour thereof. Advantageously, the accessory extends in a flat manner, that is to say, its thickness is far smaller than its length and its width.

The main advantage of this high-frequency welding method is applying high-frequency welding energy substantially over the entire surface of the accessory. The profile of the relief of the male mold and the cavity of the female mold are substantially of the same shape and dimensions as the profile of the accessory to be welded to the substrate and this ensures a diffusion of the high-frequency welding energy over the entire surface of the accessory. Consequently, the accessory will be welded to the substrate in a more effective and durable manner.

BRIEF DESCRIPTION OF THE DRAWINGS

The features and advantages of the invention will be better appreciated from the detailed description of a number of embodiments thereof which are illustrated, by way of non-limiting example, with reference to the appended drawings, in which.

DETAILED DESCRIPTION OF THE PREFERRED EMBODIMENTS

Figure 1:
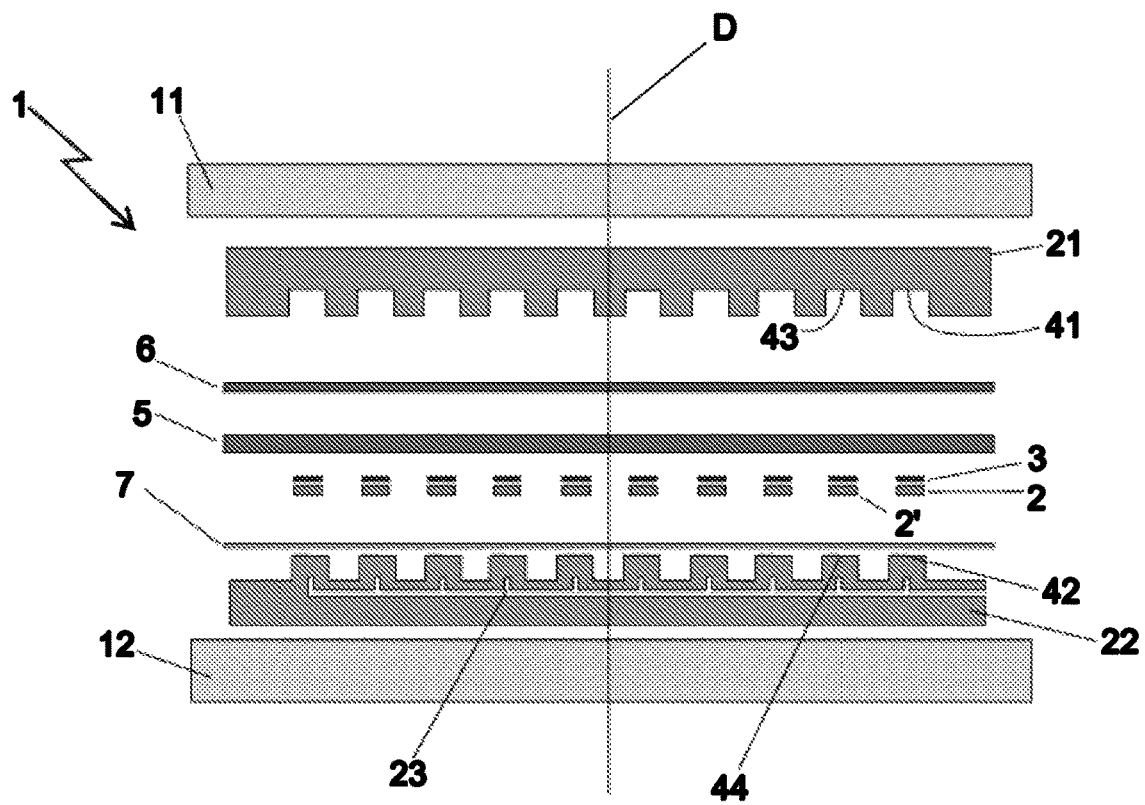
FIG. 1 is a schematic illustration of high-frequency welding machinery used to carry out the method to which the invention relates according to a first mode.

FIG. 1 schematically illustrates an embodiment of high-frequency welding machinery 1 used to weld an accessory 2, which defines a profile having a specific shape and dimensions, to a substrate 5.

The type of the profile of the accessory 2 may advantageously be a logo, pattern, design, lettering, etc.

The accessory 2 is preferably made from polymer material, more preferably from PVC (polyvinyl chloride) or PU (polyurethane). It is also possible to construct the accessory 2 from other materials, for example, coated eco-leather type materials.

The accessory 2 advantageously comprises an adhesive layer 3, more advantageously a low-melt adhesive layer 3, for example, hot melt. The hot melt is a thermoplastic glue, normally based on polyurethane or polyamide. The adhesive layer 3 is preferably directed towards the substrate 5. When welding energy is supplied, the low-melt adhesive layer 3 tends to melt at a lower temperature than the substrate 5, being introduced inside the substrate 5 and promoting the adhesion of the accessory 2 to the substrate 5. Advantageously, the melting temperature of the low-melt adhesive 3 is between 60° C. and 120° C.

In other embodiments, the accessory 2 may not have the adhesive layer 3 but may in any case be welded to the substrate 5. However, it will be necessary to vary the parameters of the high-frequency welding machinery 1, for example, by increasing the welding energy with respect to the case in which the accessory 2 comprises the adhesive layer 3.

The values of the parameters of the high-frequency welding machinery 1 depend on the type of the materials used for the accessory 2 and the substrate 5 and the thicknesses thereof. This is because some materials are more compatible with this type of welding than others.

Preferably, the adhesive layer 3 has a thickness in the order of micrometers, more preferably between 30 and 200 micrometers.

The substrate 5 is preferably of the woven type, for example, cotton, Lycra®, polyester or wool, of the hide type, coated type, for example, eco-leathers of PVC/PU, or microfiber type. The substrate 5 may advantageously be pre-treated (or "stabilized" as referred to using jargon), for example, stretched, cold-pressed, hot-pressed, etc. This depends on the type of material of the substrate 5 and the conditions to which the substrate 5 is subjected before being used in the welding method.

The high-frequency welding machinery 1 comprises a movable upper plate 11 (also referred to as the "machine head") and a fixed lower plate 12 (also referred to as the "machine plane"). The upper plate 11 and the lower plate 12 are constructed from electrically conductive material and are suitable for acting as electrodes.

On the movable upper plate 11 is mounted a female mold 21, which comprises a cavity 41 which is formed by a profile substantially having the same shape and dimensions as the accessory 2, or a male mold 22, which comprises a relief 42 which is formed by a profile having substantially the same shape and dimensions as the accessory 2.

Advantageously, the cavity 41 and the relief 42 have complementary shapes. In other words, the cavity 41 defines a perimeter on a plane of the female mold 21 of a shape substantially corresponding to the perimeter defined by the reliefs 42 on a closing plane of the male mold 22.

In some embodiments, the relief 42 can therefore penetrate inside the cavity 41.

As can be appreciated from the example of embodiment of FIGS. 9a and 9b, in the event that the accessory is a writing, the same writing will be made in negative on the female mold 21 to form the cavity 41 and in positive on the male mold 22 a form the relief 42. It is evident that for accessories of different shapes the same concept will be applied for the shapes of cavity 41 and relief 42.

Figure 2:
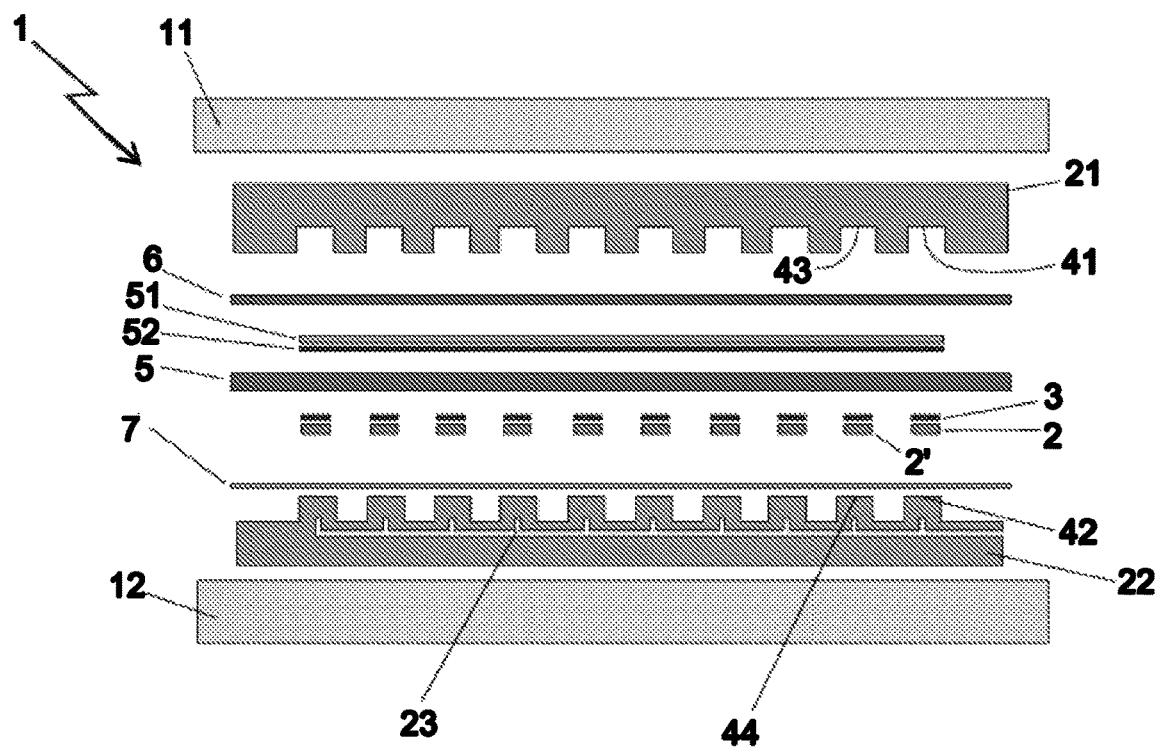
FIGS. 2 and 3 illustrate two alternative embodiments of the method illustrated in FIG. 1, with an optional single strip insert and an optional insert at the accessory, respectively.
Figure 3:
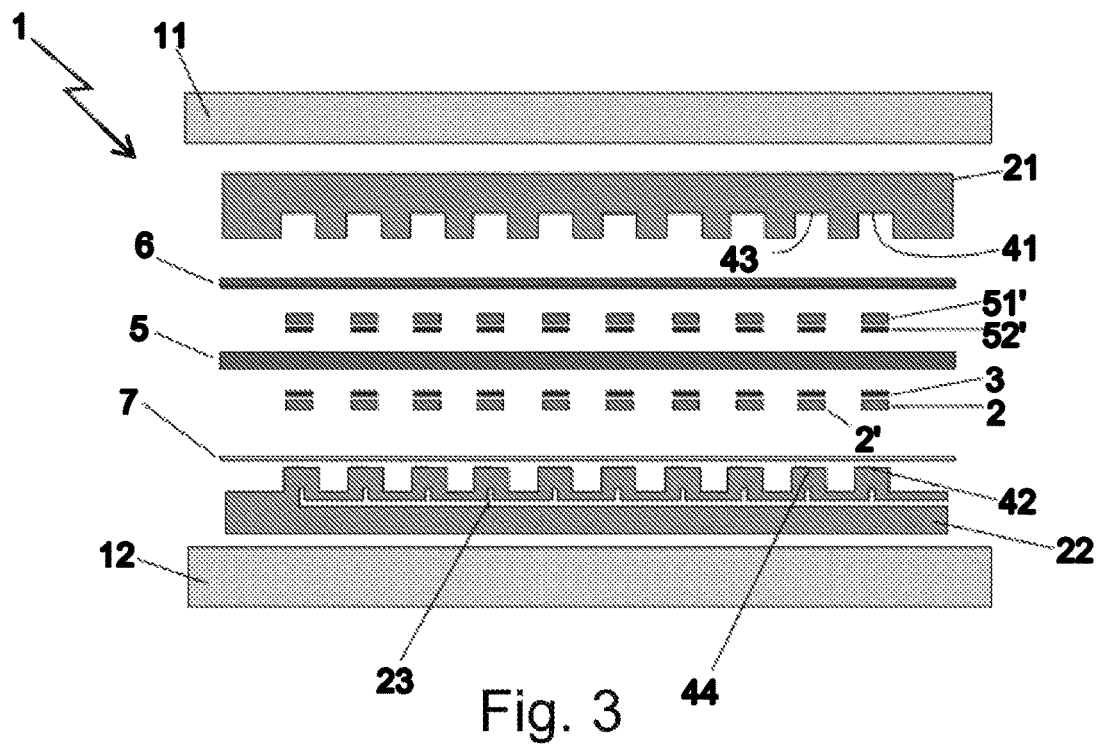

On the fixed lower plate 12 is mounted the female mold 21, if the male mold 22 is mounted on the movable upper plate 11 (see FIGS. 4, 5 and 6), or the male mold 22, if the female mold 21 is mounted on the movable upper plate 11 (see FIGS. 1, 2 and 3). In both cases, this is carried out in such a manner that the profile of the cavity 41 is aligned in a closure direction of the molds D (see FIG. 1) with the profile of the relief 42 in such a manner that, when the female mold 21 is closed on the male mold 22, the profile of the cavity 41 coincides with the profile of the relief 42. The closure direction of the molds D is advantageously perpendicular to a mounting surface of the mold 11, 12 on the plate 21, 22. With reference to FIG. 1, the closure direction of the molds D is substantially vertical. The female mold 21 and the male mold 22 will also be indicated as a mold and counter-mold.

FIGS. 1, 2 and 3 illustrate embodiments, in which the female mold 21 is mounted on the movable upper plate 11 and the male mold 22 is mounted on the fixed lower plate 12.

Figure 4:
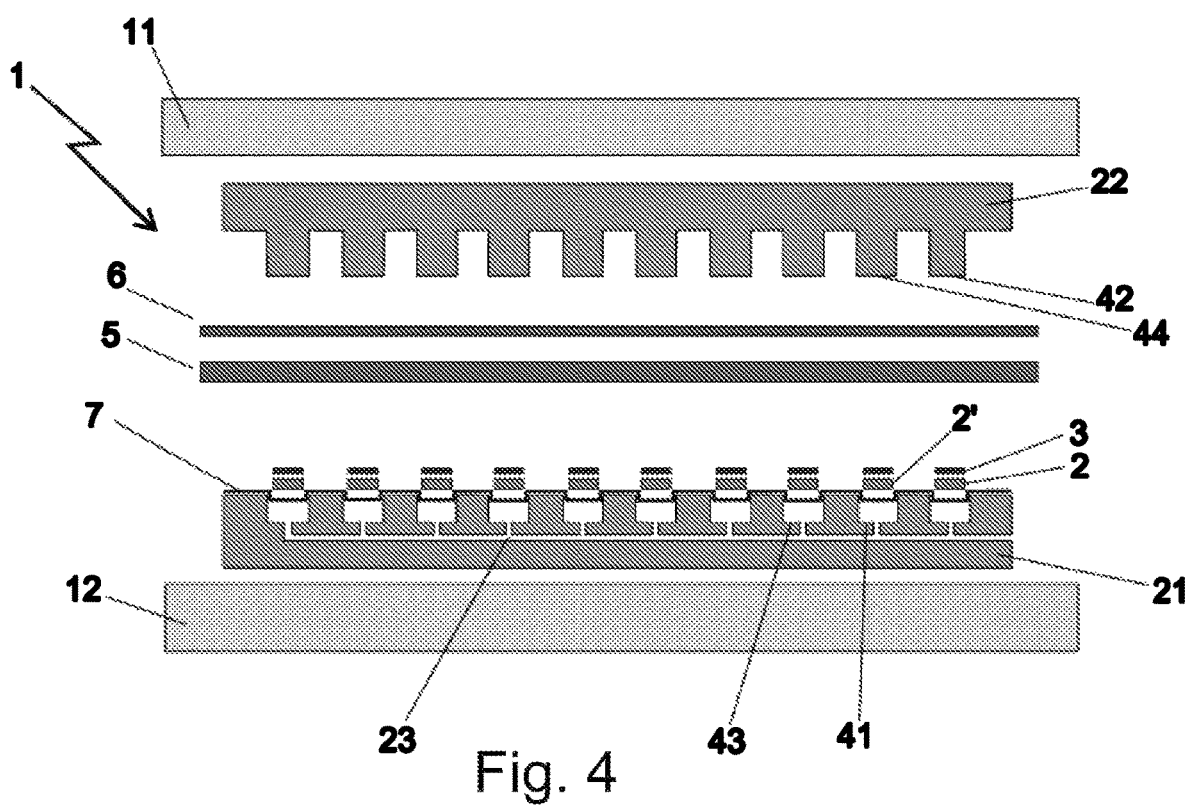
FIG. 4 is a schematic illustration of high-frequency welding machinery used to carry out the method to which the invention relates according to a second mode.
Figure 5:
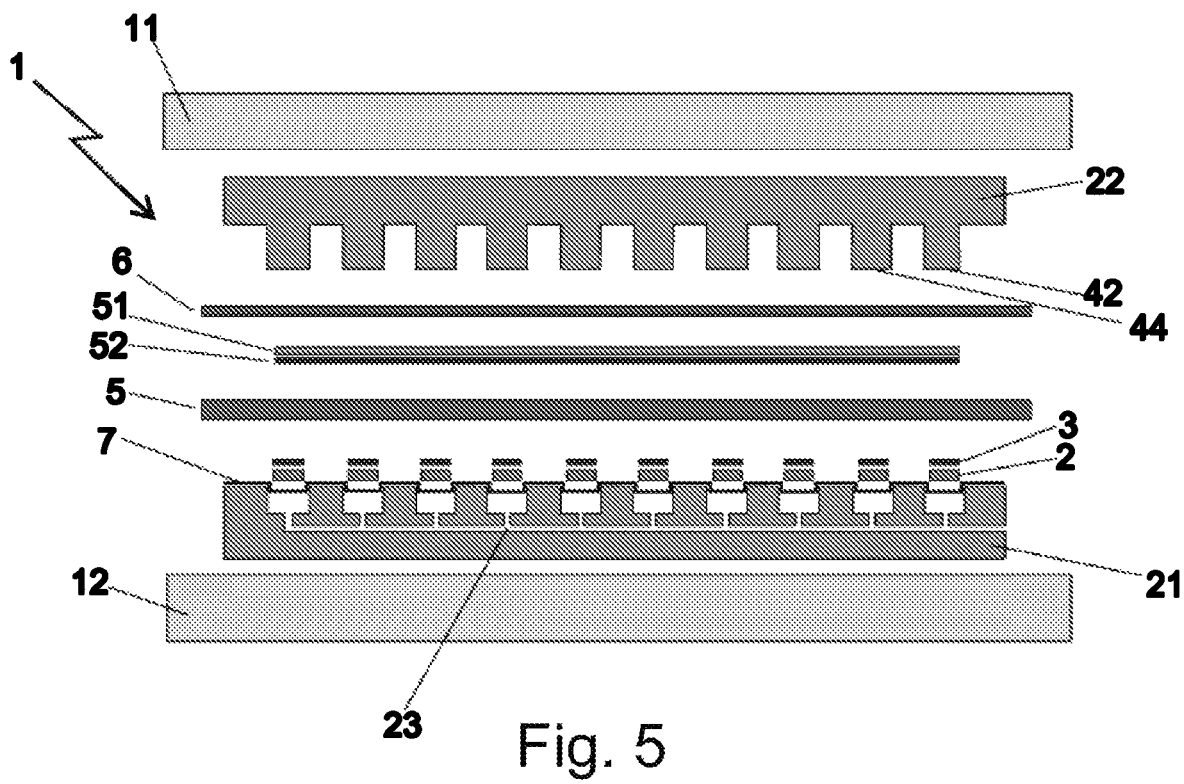
FIGS. 5 and 6 illustrate two alternative embodiments of the method illustrated in FIG. 4, with an optional single strip insert and an optional insert at the accessory, respectively.
Figure 6:
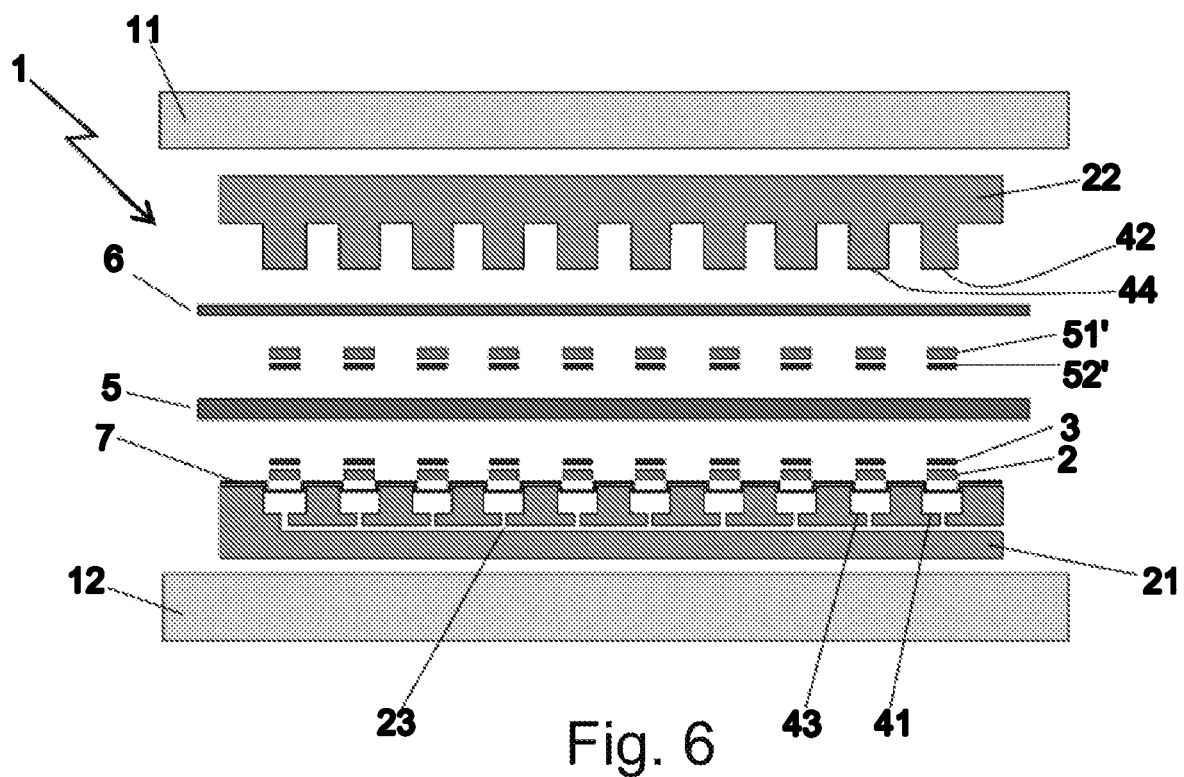

FIGS. 4, 5 and 6 illustrate embodiments in which the male mold 22 is mounted on the movable upper plate 11 and the female mold 21 is mounted on the fixed lower plate 12.

The movable upper plate 11 and the fixed lower plate 12 are preferably parallel with each other and have such dimensions as to allow the molds 21, 22 to be mounted.

The molds 21, 22 are advantageously made of brass, aluminum, steel, magnesium or Ergal 7075.

Figure 9A:
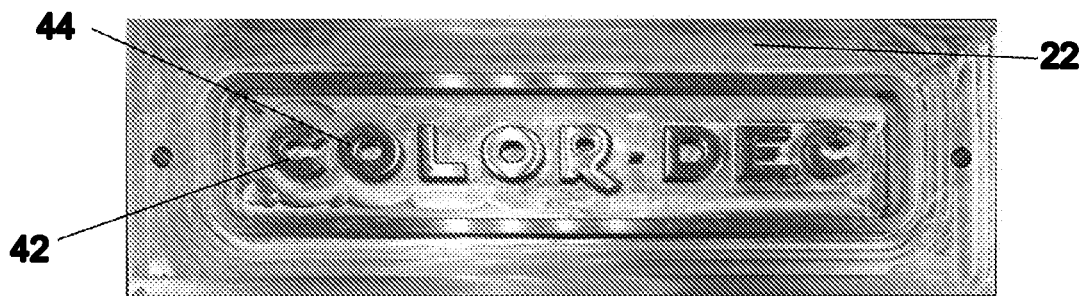
FIGS. 9a and 9b show an example of a male mold and a female mold, respectively.
Figure 9B:
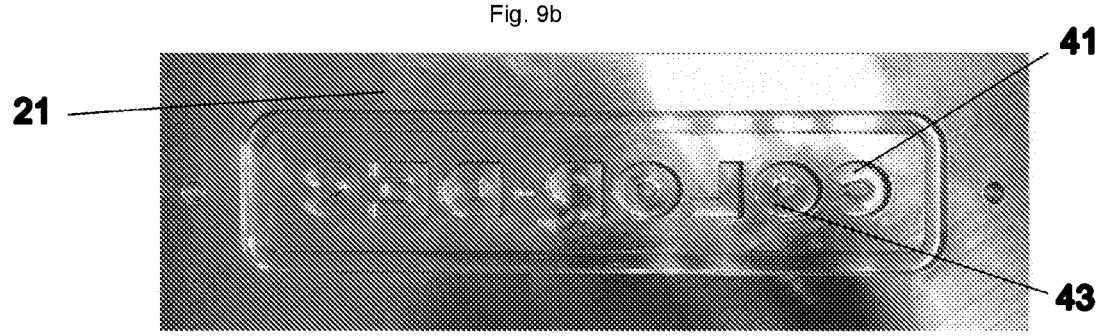

FIGS. 9a and 9b show an example of the male mold 22 and the female mold 21, respectively.

The process by means of which the cavity 41 and the relief 42 are brought about is preferably carried out by means of a numerical-control pantograph or laser cutting.

The movable upper plate 11 can be moved between two positions: a rest position and operating position. In the rest position, the movable upper plate is at the maximum distance from the fixed lower plate 12 promoting the assembly operations of the molds 21, 22 on the plates 11, 12 and the positioning of the accessory 2 and the substrate 5 on the molds 21, 22. In the operating position, the movable upper plate 11 is at the minimum distance from the fixed lower plate 12.

The upper plate 11 is capable of advantageously being moved by means of a press, which is not illustrated. Generally, two types of presses can be used: hydraulic or pneumatic. In some applications, it is preferable to use the pneumatic press because it allows a more uniform pressure to be applied to the elements to be welded with respect to the hydraulic press. The press is preferably connected to the upper plate 11 by means of a piston, which is not illustrated. Preferably, the start of the movement of the movable upper plate 11 can be brought about by means of a push-button, a pedal or manually.

According to an aspect of the invention, the high-frequency welding machinery 1 comprises a control system for the pressure of the press. In an advantageous embodiment, there are present two pressure sensors which control two levels of pressure of the press. The pressure level of the press brings about the advance of the movable upper plate 11 towards the fixed lower plate 12.

Preferably, the movable upper plate 11 starts from the rest position and advances towards the fixed lower plate 12 on the basis of the pressure imposed on the first barometer until the two plates 11, 12 are at a predetermined first distance. Advantageously, the pressure imposed on the first pressure sensor varies on the basis of the material and the thicknesses of the elements to be welded and is generally between 4 and 8 bar for a pneumatic press and between 60 and 200 bar for a hydraulic press.

Advantageously, the movable upper plate 11 can further advance from the first predetermined distance towards the fixed lower plate 12 on the basis of the pressure which is imposed on the second pressure sensor until the movable upper plate 11 reaches the operating position. Advantageously, the pressure imposed on the second pressure sensor varies on the basis of the material and the thicknesses of the elements to be welded and may be higher lower than the pressure imposed on the first pressure sensor.

Preferably, the high-frequency welding machinery 1 comprises a mechanical stop which blocks the advance of the movable upper plate 11 when a predetermined limit is reached, advantageously corresponding to the operating position.

According to another aspect of the invention, the high-frequency welding machinery 1 comprises an adjustment system for the oscillation frequency, preferably imposed on two different frequencies in accordance with the distance of the movable upper plate 11 from the fixed lower plate 12. Advantageously, a first frequency level is imposed when the upper plate 11 is between the rest position and the first predetermined distance from the lower plate 12. Preferably, a second frequency level is imposed when the upper plate 11 is between the first predetermined distance from the lower plate 12 and the operating position.

According to another aspect of the invention, the high-frequency welding machinery 1 comprises an inclination adjustment system which allows modification of the inclination of the movable upper plate 11 in order to align it with the fixed lower plate 12.

The high-frequency welding energy is supplied to the movable upper plate 11 and/or to the fixed lower plate 12 by means of a generator, which is inside the high-frequency welding machinery 1 and which is not illustrated. Preferably, the generator has a frequency output of 27.1 Mhz.

In a preferred embodiment, the generator is connected only to the movable upper plate 11. In this case, the welding energy is preferably transferred to the lower plate 12 when the upper plate 11 is in the operating position.

In some embodiments, the plates 11, 12 can be heated or cooled in accordance with the type of material and the thickness of the elements to be welded. Consequently, the molds 21, 22 which are mounted on the plates 11, 12 will also be heated or cooled. Advantageously, the heating is brought about by means of an electrical resistance inside the plates 11, 12 and not illustrated. Preferably, the cooling is carried out by means of a pipe inside the plates 11, 12 (not illustrated), where a liquid flows which is brought to a low temperature by means of a serpentine heat exchanger. Advantageously, the temperature of the movable upper plate 11 is between 5° and 100° C. Preferably, the temperature of the fixed lower plate 12 is between 3° and 60° C.

As previously described, the female mold 21 comprises a cavity 41 which is formed by a profile substantially having the same shape and dimensions as the accessory 2 and the male mold 22 comprises a relief 42 which is formed by a profile substantially having the same shape and dimensions as the accessory 2.

In other words, the shape of the profile of the accessory 2 projects or protrudes on the male mold 22 while the shape of the profile of the accessory 2 is sunken or hollowed in the female mold 21.

In some embodiments, the dimension of the profile of the cavity 41 and of the relief 42 can be slightly greater than those of the profile of the accessory 2 so as to make positioning of the accessory in the cavity or on the relief 42 easier.

The accessory 2 is positioned on the relief 42 if the male mold 22 is mounted on the fixed lower plate 12 or in the cavity 41 if the female mold 21 is mounted on the fixed lower plate 12. The substrate 5 is positioned above the accessory 2. If the accessory 2 comprises the adhesive layer 3, the adhesive layer 3 is directed towards the substrate 5.

When the movable upper plate 11 is between the first predetermined distance and the operating position, the accessory 2 and the area of the substrate 5 at the accessory 2 will be inserted between the cavity 41 and the corresponding relief 42. In this situation, the female mold 21 and the male mold 22 move into contact with the elements to be welded being interposed, that is to say, with the accessory 2 and the area of the substrate 5 being interposed at the accessory 2. At the accessory 2, therefore, there is indirect contact between the female mold 21 and the male mold 22. The contact is defined to be "indirect" because the accessory 2 and the substrate 5 are interposed between the mold 21 and the counter-mold 22. It will be described below that there exist embodiments of the method in which additional elements may be present, besides the accessory 2 and the substrate 5, and interposed between the molds 21, 22.

Preferably, in the areas in which the accessory 2 is not present, the mold 21 and the counter-mold 22 are not in either direct or indirect contact.

The fact that the cavity 41 and the relief 42 both have a profile with the same shape and dimensions as the profile of the accessory 2 allows the application of high-frequency welding energy substantially to the whole of the surface of the accessory 2.

The product which is obtained by the welding method to which the invention relates has a welding of better quality and resistance than in the prior art, as shown by the results of various tests, for example, washing tests, hydrolysis or abrasion. The final product which results from the welding method to which the invention relates will further have optimum characteristics of brightness, aesthetics and quality.

In some embodiments, there is provision for a plurality of accessories 2, 2' to be welded at the same time to the substrate 5. In this case, the female mold 21 comprises a plurality of cavities 41, 43 and the male mold 22 comprises a plurality of reliefs 42, 44. Preferably, the profiles of the accessories 2, 2' can have different shapes, for example, they may constitute the letters of a word.

Each accessory 2, 2' is positioned in the respective cavity 41, 43 or on the respective relief 42, 44 in such a manner that the profile of the accessory 2 coincides with the profile of the respective cavity or respective relief. The term "respective cavity or respective relief" is intended to be understood to be the cavity or relief having a profile with substantially the same shape and dimensions as the profile of the accessory. The fact of being able to simultaneously weld a plurality of accessories 2, 2' to the substrate 5 allows the welding operations to be made faster.

The welding method to which the invention relates allows the accessory 2 to be welded to the substrate 5 at least in accordance with two different modes: first mode and second mode.

Figure 10A:
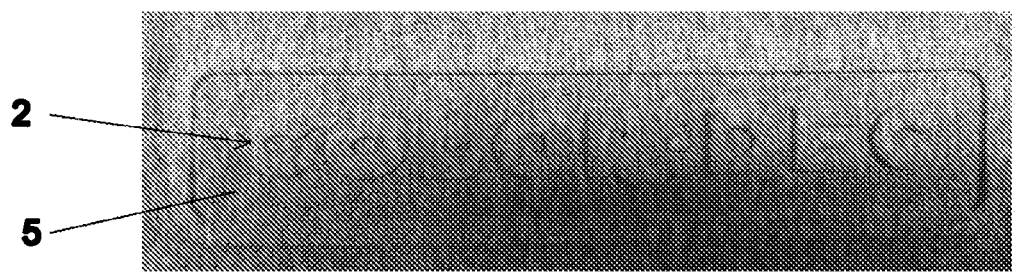
FIGS. 10a and 10b show an example of a finished product which is obtained according to the first mode and the second mode, respectively.

In the first mode, the female mold 21 is mounted on the movable upper plate 11 and the male mold 22 is mounted on the fixed lower plate 12. The accessory 2 is positioned as described above on the relief 42 of the male mold 22 in order to obtain a final product in which the accessory 2 is welded below the substrate 5, as can be seen in FIG. 10a.

Figure 10B:
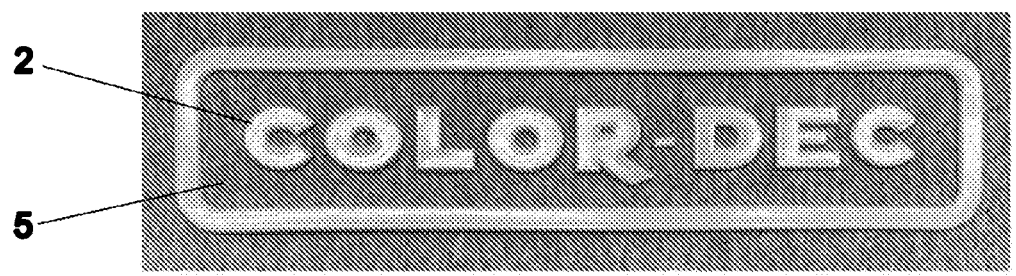

In the second mode, the female mold 21 is mounted on the fixed lower plate 12 and the male mold 22 is mounted on the movable upper plate 11. The accessory 2 is positioned as previously described in the cavity 41 of the female mold 21 in order to obtain a final product, in which the accessory 2 is welded above the substrate 5, as can be seen in FIG. 10b.

The operations for switching between the two modes comprise the inversion of the molds 21, 22 on the plates 11, 12. This makes the welding method particularly flexible and capable of producing at least two different types of product.

According to an aspect of the invention, the female mold 21 and/or the male mold 22 comprise(s) a suction system 23 which is suitable for keeping the accessory 2 fixed in position in the cavity 41 or on the relief 42, respectively. Advantageously, the suction system 23 is present on the female mold 21 or on the male mold 22, mounted on the fixed lower plate 12. Preferably, in the cavity 41 and/or on the relief 42 there are micro-holes which are connected to a suction pipe which is inside the mold 21, 22 and which draws in the accessory 2 in a downward direction, keeping it fixed in position during the welding operations.

As set out above, there may be embodiments in which there are present additional elements, besides the accessory 2 and the substrate 5, which are interposed between the two molds 21, 22.

In a preferred embodiment, there is provision for using an insulating film 6, 7 which is advantageously made from carrier, polypropylene or nylon. Preferably, the insulating film 6, 7 is positioned in contact with the female mold 21 and/or with the male mold 22. The main function of the insulating film 6, 7 is to prevent the female mold 21 and the male mold 22 from coming into contact with each other, causing an over-voltage state which would damage the high-frequency welding machinery 1. The insulating film 6, 7 is subsequently advantageously removed from the finished product.

According to another aspect of the invention, an optional insert 51, 51' (which can be seen in FIGS. 2, 3, 5 and 6) can be positioned on the substrate 5 on the opposite side of the accessory 2. Preferably, the optional insert 51, 51' is produced from polymer material, more preferably from PVC (polyvinyl chloride) or PU (polyurethane). It is also possible to construct the optional insert 51, 51' from other materials, for example, coated eco-leathers.

In the embodiments illustrated in FIGS. 2 to 5, the optional insert 51 is a single strip which extends over the entire length of the molds 21, 22.

In the embodiments illustrated in FIGS. 3 and 6, the optional insert 51' is formed by a profile having substantially the same shape and dimensions as the accessory 2 and is positioned in such a manner that the profile of the optional insert 51' coincides with the profile of the accessory 2.

Preferably, the optional insert 51, 51' may comprise an adhesive insert 52, 52' having the same characteristics as the adhesive layer 3 described above. The adhesive insert 52, 52' is advantageously directed towards the substrate 5. This simplifies the connection of the insert 51, 51' to the substrate 5 when welding energy is supplied.

In the first mode of the welding method, the optional insert 51, 51' may preferably comprise silkscreen ink or a thermally transferable film. This may be used to add additional coloration to the finished product.

In the second mode of the welding method, the optional insert 51, 51' is used to increase the resistance of the finished product. This is advantageous particularly when the substrate 5 is particularly thin.

According to another aspect of the invention, the high-frequency welding method may comprise a preliminary step of generating the accessory 2. The preliminary step of generating the accessory 2 is particularly advantageous for obtaining the accessory 2 which defines the profile having a shape and dimensions which most closely resemble the profile of the cavity 41 and the relief 42 so that the accessory 2 can be combined with said cavity 41 and said relief 42 with great precision.

The preliminary step of generating the accessory 2 preferably comprises an optional pre-cutting of the accessory material 50 in a standard format; an optional application of adhesive 30; a main cutting operation in order to obtain the accessory 2 which defines the profile with desired shape and dimensions.

An accessory material 50 used for producing the accessory 2 is preferably packaged in reels. The material 50 is generally a polymer material. The thickness of the accessory material 50 may advantageously vary between 0.3 mm and 1.5 mm. This depends on the type of consistency which it is desirable to attribute to the accessory 2 which will be generated.

The accessory material 50 is optionally pre-cut to a standard format which varies in accordance with the dimensions and the final shape of the accessory 2 which it is desirable to obtain. The standard formats may be, for example, rectangular, squared, profiled, etc. In order to carry out the optional pre-cutting, it is advantageously used a cutting bench.

Subsequently, an adhesive 30 is optionally applied to the accessory material 50 so as to obtain an accessory 2 comprising an adhesive layer 3. As described above, the adhesive 30 is preferably of the low-melt type, for example, hot melt.

Preferably, the application of the adhesive 30 to the accessory material 50 is carried out using presses or hot calendaring units.

Once the adhesive 30 is applied to the accessory material 50, the main cutting operation is carried out in order to obtain the accessory 2 which defines the profile with the desired shape and dimensions. The main cutting is preferably carried out by means of one of the following processes: cutting with punches, laser cutting, cutting using high-frequency welding or plotter cutting.

Figure 7:
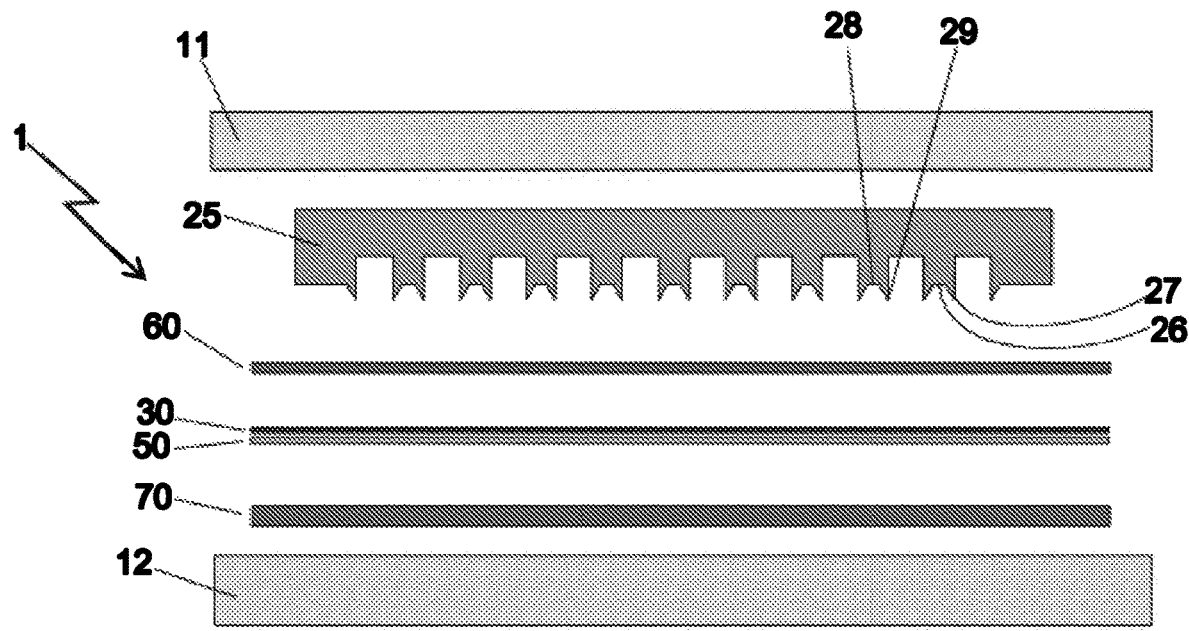
FIGS. 7 and 8 illustrate two embodiments of a main cut included in a preliminary step for generating the accessory in order to obtain an accessory suitable for the first mode and the second mode, respectively.
Figure 8:
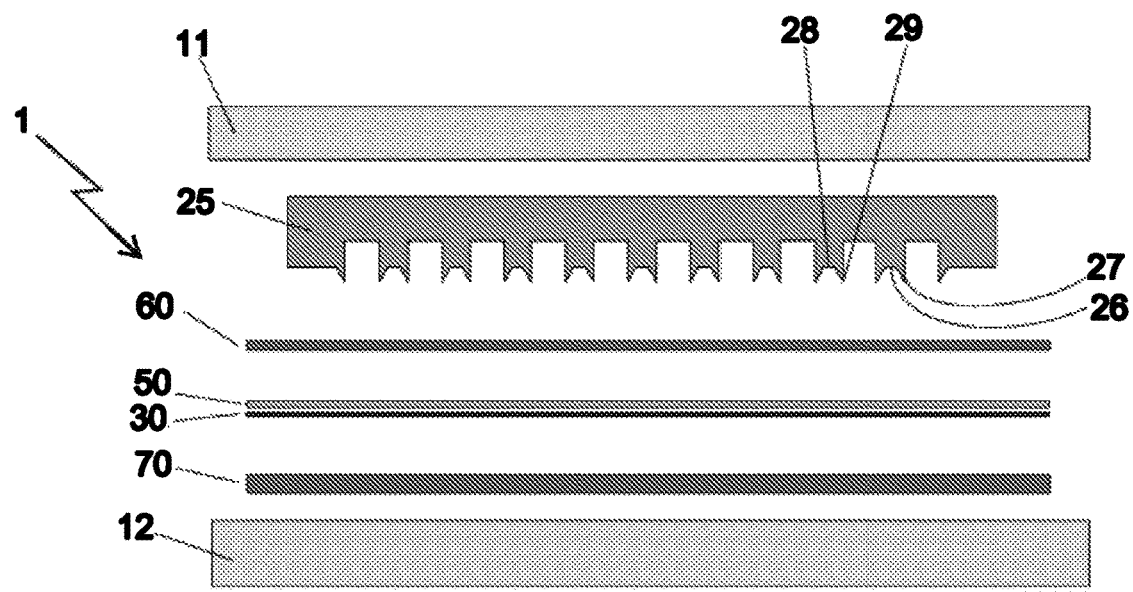

FIGS. 7 and 8 show two embodiments in which the cutting is carried out by means of high-frequency welding. The high-frequency welding machine 1 may be the same as the one used to carry out the high-frequency welding method.

A cutting mold 25 is preferably mounted on the movable upper plate 11. Advantageously, the cutting mold 25 comprises a protuberance 26 which is formed by a profile having the same shape and dimensions as the profile of the accessory 2 which it is desirable to obtain. Preferably, the protuberance 26 comprises a cutting edge 27 which is suitable for carrying out the cutting of the accessory material 50 and for obtaining the accessory 2 which defines the profile with the shape and dimensions desired.

In a preferred embodiment, the cutting mold 25 comprises a plurality of protuberances 26, 28, each one comprising a cutting edge 27, 29. This allows the operations to be made faster and allows to obtain a plurality of accessories 2, 2' at the same time.

Advantageously, the cutting by means of high-frequency welding comprises using an insulating film 60, preferably made of carrier, polypropylene or nylon. The insulating film 60 is advantageously positioned in contact with the cutting mold 25. In a preferred embodiment, it is used an insulating Teflon film 70, which is preferably positioned in contact with the fixed lower plate 12.

FIG. 7 illustrates an embodiment for obtaining an accessory 2 which is suitable for being used subsequently in the first mode of the high-frequency welding method. In this case, the adhesive 30 is directed towards the movable upper plate 11.

FIG. 8 illustrates an embodiment for obtaining an accessory 2 which is suitable for being used subsequently in the second mode of the high-frequency welding method. In this case, the adhesive 30 is directed towards the fixed lower plate 12.

The preliminary step can also be used for constructing the optional insert 51'.

After constructing the accessory 2 which defines the profile with the desired shape and dimensions, it is possible to weld it to the substrate 5 by following the high-frequency welding method described above.

Therefore, the invention solves the problem set out, at the same time affording a number of advantages, particularly to allow high-frequency welding energy, as a result of the characteristics of the mold and counter-mold, to be applied substantially to the entire surface of the accessory and to weld the accessory to the substrate in a more effective and durable manner.

The invention claimed is:

1. A high-frequency welding method for welding an accessory to a substrate by means of high-frequency welding machinery, the accessory having a profile with a specific shape and dimensions and wherein the high-frequency welding machinery includes a female mold, comprising a cavity formed by a profile having substantially the same shape and dimensions as the accessory, and a male mold, comprising a relief formed by a profile having substantially the same shape and dimensions as the accessory, wherein the substrate is comprised in a fabric for garments or upholstery, the method comprising:
    mounting the female mold or the male mold on a movable upper plate of the high-frequency welding machinery;
    mounting on a fixed lower plate of the high-frequency welding machinery the female mold, if the male mold is mounted on the upper plate, or the male mold, if the female mold is mounted on the upper plate, in such a manner that the profile of the cavity is aligned in a closure direction of the molds with the profile of the relief in such a manner that, when the female mold is closed on the male mold, the profile of the cavity coincides with the profile of the relief;
    positioning the accessory on the relief, if the male mold is mounted on the fixed lower plate, in such a manner that the profile of the accessory coincides with the profile of the relief or in the cavity, if the female mold is mounted on the fixed lower plate, in such a manner that the profile of the accessory coincides with the profile of the cavity;
    positioning the substrate above the accessory;
    moving the movable upper plate towards the fixed lower plate in such a manner that the accessory is pressed between the cavity and the relief;
    supplying high-frequency welding energy to the movable upper plate and/or to the fixed lower plate so as to weld the accessory to the substrate;
    wherein said method comprises cutting a sheet of material according to the profile with the shape and dimensions desired in order to obtain the accessory; and
    wherein said cutting is carried on the same high-frequency welding machine used to carry out the high-frequency welding method, by mounting a cutting mold on the movable upper plate.

2. The high-frequency welding method according to claim 1, wherein a plurality of accessories (2, 2') are welded at the same time to the substrate (5), wherein the female mold comprises a plurality of cavities (41, 43) and the male mold comprises a plurality of reliefs (42, 44) so as to be able to position each accessory (2, 2') in a respective cavity (41, 43) or on a respective relief (42, 44).

3. The high-frequency welding method according to claim 1, wherein the female mold and/or the male mold comprise a suction system which is suitable for keeping the accessory fixed in position in the cavity or on the relief, respectively.

4. The high-frequency welding method according to claim 1, wherein an insulating film (6, 7) is positioned in contact with at least one of: the female mold or with the male mold.

5. The high-frequency welding method according to claim 1, wherein an optional insert (51; 51') is positioned on the substrate on a side of the accessory.

6. The high-frequency welding method according to claim 5, wherein the optional insert is a single strip which extends over an entire length of the molds (21, 22).

7. The high-frequency welding method according to claim 5, wherein the optional insert (51') is formed by a profile having substantially the same shape and dimensions as the accessory and is positioned in such a manner that the profile of the optional insert (51') coincides with the profile of the accessory.

8. The high-frequency welding method according to claim 1, wherein the accessory is made of polyvinyl chloride or polyurethane.

9. The high-frequency welding method according to claim 1, wherein the accessory comprises an adhesive layer which is directed towards the substrate.

10. The high-frequency welding method according to claim 1, wherein the substrate is made of woven material, hide material, coated material or microfiber material.

11. The high-frequency welding method according to claim 1, wherein the female mold and the male mold are made of brass, aluminum, steel, magnesium or forged 7075 alloyed aluminum.

12. The high-frequency welding method according to claim 1, further comprising a preliminary step of producing the accessory comprising:
- optional precutting of the accessory material in a standard format;
- optional application of adhesive;
- main cutting in order to obtain the accessory which defines a profile with the shape and dimensions desired.

13. The high-frequency welding method according to claim 12, wherein the main cutting is carried out by means of one of the following processes:
- cutting with punches;
- laser cutting;
- cutting by means of high-frequency welding; or
- plotter cutting.

14. The high frequency welding method according to claim 1, wherein said cavity and said relief have complementary shapes.

15. The high frequency welding method according to claim 1, wherein said cavity defines a perimeter (41A) on a closing plane of the female mold having a shape substantially corresponding to a perimeter (42A) defined by said relief on a closing plane of said male mold.

* * * * *